3,131,195
BETA-DIMETHYLAMINOETHYL ESTER OF PARA-CHLOROPHENOXY ACETIC ACID AND ITS PHARMACEUTICALLY ACCEPTABLE ACID ADDITION SALTS

Paul Rumpf and Germaine Thuillier, born Nachmias, Paris, France, assignors to Centre National de la Recherche Scientifique, Paris, France, a corporation of France
No Drawing. Filed Apr. 12, 1960, Ser. No. 21,608
Claims priority, application France Apr. 15, 1959
1 Claim. (Cl. 260—295.5)

This invention relates to novel basic esters and thioesters of acids of the general formula R—CO—OH which have, per se or in derivative form, plant growth-controlling properties. The novel esters and thioesters have the general formula

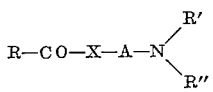

where X is an oxygen or sulfur atom, A is a straight or branched chain divalent hydrocarbon radical, and R' and R'' may each be a hydrogen atom or a saturated or unsaturated, aliphatic, aromatic or heterocyclic monovalent radical, or a divalent radical including a heteroatom, or may be respectively a hydrogen atom or a monovalent radical, and a divalent radical forming a ring with the radical designated as A.

The A radical may, for example be one of the following:

—CH$_2$—CH$_2$—; CH$_2$—CH$_2$—CH$_2$—;
—(CH$_2$)$_n$—CH(CH$_3$)—

R' and R'' may, for example, be selected from amongst the following: methyl, ethyl, propyl, isopropyl, allyl, benzyl, or a radical of the form —(CH$_2$)$_n$—; or of any of the following forms:

—CH$_2$—CH$_2$—O—CH$_2$—CH$_2$—
—CH$_2$—CH$_2$—NH—CH$_2$—CH$_2$—
—CH$_2$—CH$_2$—N(CH$_3$)—CH$_2$—CH$_2$—

Further, one of R' and R'' may be a hydrogen atom or a monovalent radical while the other may be a divalent radical forming a ring, with the A radical, as in a compound of the type

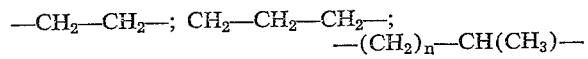

Also comprised in the invention are salts formed by the esters specified above with pharmaceutically permissible acids such as hydrochloric, nitric, sulfuric, acetic, isobutyric, diethylacetic, oxalic, succinic, fumaric, maleic, citric, lactic, tartric, ethandisulfonic, phenylpropionic phenyl-butyl-acetic, p-acetamidobenzoic, ascorbic, nicotinic and other acids.

The method of preparing the above-specified novel compounds comprises reacting in an anhydrous organic medium one mole of a halide of an acid having plant-growth-control properties, with one or two moles of an amino-alohol or an amino-thiol having an amine function, preferably a tertiary amine function. Preferably the reaction is conducted in the presence of an agent capable of fixing the halohydric acid that simultaneously forms, for example an additional mole of the amino-alcohol the ester of which it is desired to produce.

When two moles of amine alcohol or amino-thiol are used per mole acid halide, then together with the amino-ester or amino-thioester (free and no longer combined as hydrochloride) there forms amino-alcohol hydrochloride or amino-thiol hydrochloride, which may then be separated from the organic reaction medium to isolate the ester.

Addition salts of acids and alkyl halides may be prepared from the basic ester by reacting the selected acid or organic halide with the basic ester in equivalent proportions.

If it is desired directly to produce a salt, especially a hydrochloride, of the new basic aminoesters, an alternative method may be used comprising heating, in an anhydrous organic medium, the R—CO—OH acid with the halogenated amine

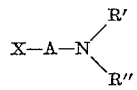

corresponding to the amino-alcohol

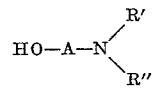

involved. This alternative method is especially desirable in those cases where it is impossible or difficult to prepare the acid chloride R—CO—Cl, as in the case of beta-indolylacetic acid. The alternative procedure is likewise advantageous in cases where the amine function is a primary or secondary function, and it is necessary to avoid the formation of hydroxyalkylamide.

The invention is more especially concerned with those ester and thioester compounds and salts thereof, as obtained by the above method, that are derived from acids such as phenoxyacetic acid and nuclear-substituted derivatives thereof (especially parachlorophenoxyacetic and parafluorophenoxyacetic acid, 2-methyl-4-chloro-phenoxyacetic acid) and alpha-p-chlorophenoxypropionic acid, alpha-naphthylacetic acid, alpha- and beta-naphthoxyacetic acids, beta-indolylacetic acid, and the corresponding phosphonic and phosphinic acids.

The basic amino-esters and thioesters specified above have been found to possess useful pharmaceutic or therapeutic properties as stimulants of the central nervous system.

Of especial interest are those esters of the specified type which have the formula

R—CO—O—CH$_2$—CH$_2$—N(CH$_3$)$_2$ and especially p-chlorophenoxyacetic acid beta-dimethylaminoethyl ester. These substances have an especially potent psychostimulating and fatigue-inhibiting action of a neuro-analeptic character, as demonstrated by pharmacological and numerous clinical tests, applied to the hydrochloride of the last-mentioned substance. They exert a progressive and delayed rather than an immediate action, and results are more marked after repeated doses have been given.

The hydrochloride of p-chlorophenoxyacetic acid beta-dimethylaminoethyl ester is a white powder, highly soluble in water, the water-solution having a pH in the range from 3.3 to 3.4.

The pharmacological study of this compound has included a study of its toxicity, including acute toxicity in mice by intravenous, peroral and intraperitoneal administration, acute toxicity in rabbits by intravenous injection and chronic toxicity in rats by probang administration. Ponderal curves were plotted, the blood formula was analyzed and anatomopathological tests were made; the central neutro-stimulating activity was investigated by inducing convulsions in fish, stimulating spontaneous activity in mice, lowering the threshold of convulsive attacks induced by Metrazol in mice, and potentializing the central nervous activity of adrenalin in rabbits. The fatigue inhibiting action was investigated by the forced-swimming test on mice.

In the clinical tests, p-chlorophenoxyacetic acid beta-dimethylaminoethyl ester hydrochloride was given orally, in tablets each containing 100 mg. of the active substance, a total of 100 to 400 mg. being given daily.

Comparative tests have shown very marked superiority both in the strength and duration of the activity, over beta-dimethylamino-ethyl p-acetamidobenzoate, previously proposed as a psycho-stimulant. Also, with respect to ephedrine, the hydrochloride of p-chlorophenoxyacetic acid beta-dimethylaminoethyl ester has shown itself as being both more potent, and free of the secondary ill-effects, such as hypertension, tachycardia, and the like, accompanying the use of ephedrine.

Thus, in cases of narcolepsy in which dimethylamino ethanol had been completely ineffective and which could only be treated with strong doses of ephedrine with objectionable cardiac consequences, the patients were cured of their drowsiness by the taking of three unit doses a day of p-chlorophenoxyacetic acid beta-dimethylaminoethyl ester hydrochloride.

The drug may be given parenterally, and especially by intravenous and intramuscular injection, as a 5%–10% aqueous solution, with possibly a buffer or isotonic addition. Other esters, such as piperidine/ethyl esters, especially as the salts of the above indicated acids, have also given excellent results.

Generally speaking the clinical test carried out with the new compounds have yielded interesting therapeutic results in neuro-psychiatry, neuro-surgery and traumatology, as well as in general practice, when used (in case of the parachlorophenoxy-acetic acid dimethylaminoethyl ester) in the form of 100 mg. tablets (3 to 6 and as many as 10 tablets per day), or 200 mg. suppositories (2 or 3 a day), or freeze-dried 250 mg. phials for intravenous or intramuscular injection (1 to 3 phials a day), or by perfusion.

Examples will now be given of the procedure for preparing some of the novel compounds of the invention. It is noted that the melting points as given hereinafter, and which are instantaneous melting points obtained with the Maquenne block technique, are in many cases rather indefinite, since the substances are hydroscopic salts which attack the metal surface of the block.

*Example 1*

One mole parachlorophenoxyacetic acid chloride and two moles N-hydroxyethylpiperidine were heated in an anhydrous benzene solution for one hour at reflux temperature. On cooling, the mixture was filtered to separate the hydroxyethylpiperidine hydrochloride formed. The filtrate was washed with several volumes of water to remove any traces of unreacted amino-alcohol. The benzene was distilled away at a reduced pressure of 15–25 mm. Hg, and the basic ester was recovered.

This ester was then converted to the hydrochloride by dissolving it in an anhydrous ester-acetone mixture and precipitating the salt with a current of dry hydrochloric acid. On recrystallization in an anhydrous ether-isopropanol mixture, the beta-piperidine/ethyl parachlorophenoxyacetate hydrochloride collected had an instantaneous melting point of 146° C.

If in the above example the parachlorophenoxyacetic acid is replaced with alpha-p-chlorophenoxypropionic acid, there is obtained, with dimethylaminoethanol, the dimethylaminoethyl ester of alpha-parachlorophenoxypropionic acid, which melts at 122° C. after recrystallization from isopropyl alcohol.

Similarly, replacing the para-chlorophenoxyacetic acid with an equimolar quantity of alpha-naphthoxyacetic acid, the dimethylamino-ethyl ester of alpha-naphthoxyacetic acid is obtained, which melts at 152° C. on recrystallization from isopropyl alcohol.

*Example 2*

Using a procedure similar to that in Example 1, the parachlorophenoxyacetic ester hydrochloride of N-hydroxyethylmorpholine was prepared. On recrystallization in an anhydrous mixture of ether and acetone, a product is obtained having a melting point of 160° C.

*Example 3*

By a similar procedure starting from dibenzylaminoethanol, beta-dibenzylaminoethyl parachlorophenoxyacetate hydrochloride was prepared. The product was purified by recrystallization from absolute ethyl alcohol and had a melting point of 118° C.

*Example 4*

One mole 2-methyl-4-chloro-phenoxyacetic acid chloride produced by reacting the acid with an excess of thionyl chloride was reacted as in the preceding examples with two moles of N-hydroxyethylpiperidine. The hydrochloride of 2-methyl-4-chloro-phenoxyacetic acid piperidino-ethyl ester thus obtained was purified by recrystallization from an anhydrous ether-acetone mixture; the melting point was 121° C.

*Example 5*

Using a similar procedure, starting with dimethylaminoethanol, the hydrochloride of beta-dimethylaminoethyl 2-methyl-4-chloro-phenoxyacetate was obtained. The product, as recrystallized from isopropyl alcohol, had a melting point of 148° C. With the diethylaminoethyl ester of the same acid, a lower melting point of about 118° C. is observed.

*Example 6*

One mole parachlorophenoxyacetic acid dissolved in anhydrous isopropyl alcohol was treated with one mole 1-dimethyl-amino-3-chloro-propane also dissolved in anhydrous isopropyl alcohol. The mixture was heated at reflux for two hours, then cooled and the hydrochloride of parachlorophenoxyacetic acid 3-dimethylamino propyl ester was precipitated with anhydrous ether. It was then purified by recrystallization in anhydrous isopropyl alcohol. The melting point was 105° C.

*Example 7*

A similar operating procedure yielded the hydrochloride of para-chlorophenoxyacetic acid dimethylaminoisopropyl ester from the said acid and 1-dimethylamino-2-chloropropane. On recrystallization from isopropyl alcohol, the hydrochloride had a melting point of 175° C.

*Example 8*

To a solution of p-chlorophenoxyacetic acid chloride, prepared, e.g., by reacting one mole of the acid with two moles of thionyl chloride at elevated temperature in three times its volume of anhydrous benzene, there was added beta-dimethylaminoethanol in a proportion of two moles per mole of the chloride. The mixture was heated at reflux for one hour, filtered for separating the dimethylaminoethanol hydrochloride formed, and the benzene was distilled out of the filtrate under a reduced pressure of 15 to 25 mm. Hg to recover the basic ester.

To convert this to the hydrochloride, the ester was dissolved in an ether-acetone mixture and precipitated with a stream of anhydrous hydrochloric acid.

On recrystallization from anhydrous isopropanol, the resulting hydrochloride had an instantaneous melting point (Maquenne block) of 139° C. This melting point is highly sensitive to the presence of traces of humidity or solvent and may appear to be reduced to 136° C. and even substantially lower, depending on the nature of the contact formed between the substance and the metal surface of the Maquenne block, which is visibly corroded.

Following the general teachings of the foregoing example, the beta-dimethylaminoethyl esters of yet other acids of the plant growth-stimulating class have been prepared, especially those acids specifically mentioned above, as well as salts formed from such basic esters and hydrochloric acid, as well as other acids permissible form a pharmacological standpoint. Thus, the acid maleate of p-chlorophenoxyacetic acid dimethylaminoethyl ester was prepared and found to have a melting point of 123° C.; the tartrate and citrate were also prepared, both melting at about 100° C. in their crystallization water.

What we claim is:

A compound selected from the group consisting of the beta-dimethylaminoethyl ester of parachlorophenoxyacetic acid and its pharmaceutically acceptable acid addition salts.

References Cited in the file of this patent

UNITED STATES PATENTS

| | | |
|---|---|---|
| 2,396,513 | Jones | Mar. 12, 1946 |
| 2,428,978 | Martin et al. | Oct. 14, 1947 |
| 2,628,973 | Cusic | Feb. 17, 1953 |
| 2,726,947 | Baumgartner | Dec. 13, 1955 |
| 2,744,818 | Davie | May 8, 1956 |
| 2,761,773 | Davie | Sept. 4, 1956 |
| 2,763,540 | Steward et al. | Sept. 18, 1956 |
| 2,771,477 | De Atley et al. | Nov. 20, 1956 |
| 2,782,111 | Bloch et al. | Feb. 19, 1957 |
| 2,843,471 | Fischer | July 15, 1958 |
| 2,876,089 | Brugman et al. | Mar. 3, 1959 |
| 2,899,359 | Fancher et al. | Aug. 11, 1959 |
| 2,900,411 | Harwood et al. | Aug. 18, 1959 |
| 2,922,744 | Mills et al. | Jan. 26, 1960 |
| 2,957,760 | Tafuro et al. | Oct. 25, 1960 |

OTHER REFERENCES

Newman et al.: "J. Am. Chem. Society," vol. 69, pp. 718 to 723 (1947).